(12) United States Patent
Candelario

(10) Patent No.: US 12,485,941 B2
(45) Date of Patent: Dec. 2, 2025

(54) PRODUCT TRANSPORT AND STORAGE APPARATUS AND METHOD OF USE TO ELIMINATE PRODUCT DELIVERY PACKAGING

(71) Applicant: David M. Candelario, James Island, SC (US)

(72) Inventor: David M. Candelario, James Island, SC (US)

( * ) Notice: Subject to any disclaimer, the term of this patent is extended or adjusted under 35 U.S.C. 154(b) by 542 days.

(21) Appl. No.: 17/595,985

(22) PCT Filed: May 28, 2021

(86) PCT No.: PCT/US2021/070626
§ 371 (c)(1),
(2) Date: Dec. 1, 2021

(87) PCT Pub. No.: WO2022/099228
PCT Pub. Date: May 12, 2022

(65) Prior Publication Data
US 2022/0371636 A1    Nov. 24, 2022

Related U.S. Application Data

(60) Provisional application No. 63/198,686, filed on Nov. 4, 2020.

(51) Int. Cl.
| | |
|---|---|
| *B62B 1/06* | (2006.01) |
| *B62B 1/14* | (2006.01) |
| *B65G 1/02* | (2006.01) |

(52) U.S. Cl.
CPC .................. *B62B 1/06* (2013.01); *B62B 1/14* (2013.01); *B65G 1/02* (2013.01)

(58) Field of Classification Search
CPC .... B62B 1/06; B62B 1/14; B65G 1/02; B65G 67/02; B60P 1/4428; B60P 1/5442; B66C 9/02; B66C 11/04; B66F 9/08; B66F 9/02
See application file for complete search history.

(56) References Cited

U.S. PATENT DOCUMENTS

| | | | |
|---|---|---|---|
| 2,108,104 A | | 2/1938 | Cordrey |
| 3,485,321 A | * | 12/1969 | Smith, Jr. ............. B66F 11/042 |
| | | | 182/69.5 |

(Continued)

FOREIGN PATENT DOCUMENTS

| | | | | |
|---|---|---|---|---|
| CN | 115571537 A | * | 1/2023 | |
| DE | 202009012532 U1 | * | 2/2010 | ............... B66F 9/02 |
| EP | 3372541 A1 | * | 9/2018 | ............ B25J 18/025 |

OTHER PUBLICATIONS

DE-202009012532 with EN translation (Year: 2010).*

*Primary Examiner* — Jacob S. Scott
*Assistant Examiner* — Erin Morris
(74) *Attorney, Agent, or Firm* — Carson Patents; Gregory D Carson

(57) ABSTRACT

A product transport and storage apparatus is disclosed in the form of bots which aid human activity. The invention makes the human activity less strenuous, more efficient and more productive. A primary field of use is urban and suburban food distribution. The Product Transport and Storage system comprising a truck with a truck trailer, at least one Porch Bot placeable in the truck trailer to store and transport cases of groceries, a Railed Crane Bot apparatus connected to a roof of the truck trailer to lift and place the Porch Bot(s) at least within the truck trailer, an elevator bot enabling Porch Bots to be loaded and unloaded from a truck, and a Mother Bot having a platform which is moveable vertically and horizontally to transport the Porch Bot(s) to and from the truck trailer to a porch, patio, or landing.

16 Claims, 8 Drawing Sheets

(56) References Cited

U.S. PATENT DOCUMENTS

| | | | |
|---|---|---|---|
| 4,199,170 A | 4/1980 | Hubner et al. | |
| 4,633,538 A * | 1/1987 | James | B66F 9/06 187/244 |
| 5,195,726 A * | 3/1993 | Kaner | B66C 23/48 414/800 |
| 5,381,940 A | 1/1995 | Wright | |
| 6,644,063 B2 | 11/2003 | Mogil | |
| 6,651,775 B2 * | 11/2003 | Bassett, Jr. | B66F 11/042 182/69.5 |
| 6,983,946 B2 | 1/2006 | Sullivan et al. | |
| 9,475,638 B2 | 10/2016 | Cavalcante et al. | |
| 10,118,632 B2 * | 11/2018 | Carzola | B62B 3/004 |
| 10,730,542 B1 * | 8/2020 | Guirlinger | B62B 1/24 |
| 11,560,079 B2 * | 1/2023 | Lundeen | B60P 1/38 |
| 11,829,136 B2 * | 11/2023 | Gil | B66F 9/063 |
| 11,834,271 B2 * | 12/2023 | Kalouche | B60P 3/007 |
| 2003/0206791 A1 * | 11/2003 | Wroblewski | B60P 1/4421 414/545 |
| 2005/0129490 A1 * | 6/2005 | Hutchins | B60P 3/122 414/462 |
| 2006/0045710 A1 * | 3/2006 | Hiebert | B66F 7/02 414/631 |
| 2006/0182564 A1 * | 8/2006 | Thiel | B25H 1/0014 414/427 |
| 2007/0059135 A1 * | 3/2007 | Mizner | B60P 1/4442 414/462 |
| 2008/0250984 A1 * | 10/2008 | Panzarella | B60P 3/07 108/44 |
| 2010/0191615 A1 | 7/2010 | Thomas | |
| 2019/0143872 A1 * | 5/2019 | Gil | B65G 1/0407 211/86.01 |
| 2020/0048058 A1 * | 2/2020 | Schwalbach | B62B 3/022 |
| 2021/0269110 A1 * | 9/2021 | Lockwood | B66C 1/0243 |
| 2022/0063908 A1 * | 3/2022 | Buel | B66F 9/07 |
| 2023/0406680 A1 * | 12/2023 | Varanasi | B66F 9/065 |

\* cited by examiner

PRODUCT TRANSPORT AND STORAGE APPARATUS AND METHOD OF USE TO ELIMINATE PRODUCT DELIVERY PACKAGING

FIELD OF THE INVENTION

This invention relates generally to a product transport and storage apparatus in the form of bots which aid human activity. The invention makes the human activity less strenuous, more efficient and more productive. A primary field of use is urban and suburban food distribution.

BACKGROUND

Traditionally food at a grocery store is placed in bags which a person then carries by hand to their vehicle. They transport the food home in their vehicle. They carry the bags into their home.

People who have difficulty placing food in bags, removing food from bags, carrying bags, or lifting bags have to get assistance from people who can carry and work with food in bags to get their groceries. People who have difficulty carrying bags and working with food in bags are restricted from the work of urban and suburban food distribution.

In light of the foregoing prior art, there is a need to enable more people to participate in efficient and productive urban and suburban food distribution.

SUMMARY OF THE INVENTION

According to a first aspect of the invention, there is a Product Transport and Storage System comprising at least one Porch Bot comprising a storage shell having a shelved interior for storing products, brace rails on an external side of the storage shell, and a handle frame displaceable along the brace rails to fixed positions in register with the shelves to support the products slid out of the shelved interior, a Mother Bot comprising a pad having a side to support at least one Porch Bot and an adjustable height lift connected to an opposite side of the pad from the side to support at least one Porch Bot, wherein the adjustable height lift is configured to raise, lower, and translate the pad from a landing to a storage space. The storage space may be a moveable space such as a truck trailer bed, ship cargo hold, or cargo airplane for delivery of Porch Bots. The storage space may be in a warehouse or other building or venue. The system enables workers who may have limited physical capacity to efficiently pack, transport, unload, and deliver goods and groceries.

The Product Transport and Storage System may comprise a truck with a truck trailer, at least one Porch Bot placeable in the truck trailer to store and transport cases of groceries, a Railed Crane Bot apparatus connected to a roof of the truck trailer to lift and place the Porch Bot(s) at least within the truck trailer, and a Mother Bot having a bed which is moveable vertically and horizontally to transport the Porch Bot(s) to and from the truck trailer to a porch, patio, or landing. So a person may be aided by the system to transport food collected into the cases of groceries to a porch, patio, or landing where the food may be securely stored in the Porch Bot for later use.

According to a second aspect of the invention there is a Product Transport and Storage System wherein at least one Porch Bot comprises brace rails on an external side of the storage shell to facilitate securing the storage shell during transport and to support a handle frame displaceable along the brace rails.

According to a third aspect of the invention there is a Product Transport and Storage System wherein at least one Porch Bot comprises a handle frame displaceable along the brace rails to fixed positions in register with the shelves to securely support the products slid out of the shelved interior.

According to a fourth aspect of the invention there is a Product Transport and Storage System wherein the adjustable height lift comprises at least one scissors lift having legs connected to an opposite side of the pad from the side to support at least one Porch Bot, the legs having rolling wheels at a free end distal from the pad to roll on the landing and the truck trailer bed surface to transport the Mother Bot.

According to a fifth aspect of the invention there is a Porch Bot Elevator for lifting and rotating a Porch Bot comprising a column support, a trunnion rotatably connected to the column support in parallel, and a platform base connected orthogonal to the trunnion, wherein the platform base is configured to rotate around to the column support by turning the trunnion.

According to a sixth aspect of the invention there is a Porch Bot Elevator wherein the column support comprises at least one threaded eyelet through which the trunnion passes to translate the platform base parallel to the column support while providing support for lifting.

According to a seventh aspect of the invention there is a Porch Bot Elevator wherein the column support has a longitudinal slot to access a longitudinal traversing mechanism inside the column support, wherein the threaded eyelet is connected to the longitudinal traversing mechanism for translation of the platform base.

According to an eighth aspect of the invention there is a Railed Fork Bot for lifting and positioning in a truck trailer a Porch Bot comprising a storage shell having a shelved interior, the Railed Fork Bot comprising a base end distal from a distal end, tines of a fork to lift the Porch Bot, wherein the fork extends from a carriage which slides along a rail arm from the base end to the distal end, the base end is configured to support the Railed Fork Bot vertically from a truck trailer bed floor, and the distal end comprises a rail car interface to connect to a rail car on a roof of the truck trailer to stabilize the rail car as a column.

According to a ninth aspect of the invention there is a Railed Fork Bot wherein the rail car interface is arranged to connect the distal end of the rail arm to a winch on the rail car to raise and lower the carriage along the rail arm.

According to a tenth aspect of the invention there is a Railed Fork Bot comprising teeth arrayed along a longitudinal length of the rail arm, and the carriage comprises a ratchet which operates on the teeth to raise and lower the carriage along the rail arm.

According to an eleventh aspect of the invention there is a Railed Fork Bot comprising a wheel on the base end of the rail arm to roll the rail arm along a transport vehicle surface, bed or floor.

According to a twelfth aspect of the invention there is a Railed Crane Bot apparatus for lifting and positioning in a transport vehicle a Porch Bot comprising a storage shell having a shelved interior, the Railed Crane Bot apparatus comprising: a roof rail to be connected to a roof of the transport vehicle longitudinally intermediate a front wall and an opposite rear door of the transport vehicle; a rail car which runs longitudinally along the roof rail; wherein suspended from the rail car is a winch having a cord with a free end with a hook to lift and position the Porch Bot. So the Porch Bots may be placed easily within the trailer for efficient packing a storage.

According to a thirteenth aspect of the invention there is a Railed Crane Bot apparatus comprising an extension arm which extends in a direction orthogonal to the longitudinal direction of the roof rail, wherein the hook hangs from cord which hangs over a distal end of the extension arm. So the Porch Bots can be taken from a position in the trailer to a position outside the trailer, where the distal end of the arm extends outside the trailer. Also the arm may be moved to a position inside the Porch Bot so that an individual case of groceries may be placed onto or taken off of a shelf in the Porch Bot.

The Railed Crane Bot apparatus may be arranged with the winch connected to the rail car by an axle around which the extension arm rotates when urged. Thus the Porch Bots can be moved laterally to within the trailer by rotating the arm. The Porch Bot can be moved to a precise position by both laterally and longitudinally rotating the arm to position around the rail car. The Porch Bot can be moved to position longitudinally intermediate the front wall and the rear door by moving the rail car along the rail.

The distal end may comprise a rail car interface to connect to a rail car on a roof of the truck trailer to stabilize the rail car as a column. The rail car interface may be arranged to connect the distal end of the rail arm to a winch on the rail car to raise and lower the carriage along the rail arm.

There may be a winch interface on a distal end of the rail arm from a base end. The base end may be configured to support the Railed Fork Bot from a floor of the truck trailer. The winch interface may be arranged to connect the rail arm to a winch on the roof of the truck trailer to winch the tines on the rail arm. The winch does the work of lifting the Porch Bot and the strong floor of the truck trailer supports the weight of the Porch Bot through the base end of the rail arm.

The rail car interface may be arranged to connect the distal end of the rail arm to a winch on the rail car to winch the tines along the rail arm. The winch may be on the rail car to raise and lower the carriage along the rail arm. The winch may be able to do the work of lifting the Porch Bot. This is convenient for lifting and placing the Porch Bot inside the trailer. It is also convenient for lifting the Porch Bot on and off the Mother Bot. The strong floor of the truck trailer supports the weight of the Porch Bot through the base end of the rail arm.

The Railed Fork Bot may comprise teeth arrayed along the longitudinal length of the rail arm. The carriage may comprise a ratchet which operates on the teeth to raise and lower the carriage along the rail. A hand crank may be connected to the carriage by a ratchet which operates on the teeth to jack the tines along the rail. So a person may manually jack up the Porch Bot independently of operation of the winch. The hand crank may also comprise or be used as a handle to move the Porch Bot or cases along the floor.

The Railed Fork Bot may comprise a wheel on a base end of the rail arm to roll the rail arm along the floor in the same direction the winch moves along the roof. So the Railed Fork Bot has little resistance to lateral positioning movements which makes it easy to place Porch Bots within the truck trailer.

The Porch Bot(s) can be easily transported from a truck trailer into a kitchen or storage room using the Mother Bot which is arranged to travel on a truck trailer floor, road, sidewalk, driveway, and kitchen or storage room floor. The Mother Bot may comprise a bed to support and preferably carry one or more of the Porch Bots. The Mother Bot may comprise an adjustable height lift connected to an opposite side of the bed than a side of the bed configured to support the Porch Bot(s). The adjustable height lift is useful to raise, lower, and translate the bed from a surface. The surface may be a road, sidewalk, driveway, and/or truck trailer floor. So Porch Bots on the bed may be lifted in and out of the truck trailer and transported from the truck trailer to and from a storage room or kitchen. The adjustable height lift may comprise at least one scissors lift having legs connected to the opposite side of the bed from the side configured to carry the Porch Bots. Preferably the legs have rolling wheels at a free end distal from where the legs are connected to the bed. The wheels may roll on the surface to transport the Mother Bot and preferably one or more Porch Bots on the Mother Bot.

According to a fifteenth aspect of the invention there is a method of using a Product Transport and Storage System comprising receiving an electronic order for a plurality of products, selecting and collecting said plurality of products, then storing said plurality of products within at least one Porch Bot, and relocating said at least one Porch Bot to a delivery address for said plurality of products. The method helps to reduce or eliminate product delivery packaging.

According to a sixteenth aspect of the invention there is a method further comprising moving said at least one Porch Bot into a Modern Milk Truck (MMT), lifting and positioning said at least one Porch Bot for stowage within said MMT using a Railed Crane Bot, transporting said at least one Porch Bot to said delivery address, unloading said at least one Porch Bot using the Railed Crane Bot, and transporting said at least one Porch Bot to a delivery position.

According to a seventeenth aspect of the invention there is a method wherein relocating at least one Porch Bot to a delivery address further comprises transporting a plurality of Porch Bots together upon the Mother Bot, unloading said plurality of Porch Bots at the delivery position, and separating and transporting each of said plurality of Porch Bots to its final delivery point.

The invention will now be described, by way of example only, with reference to the accompanying figures in which:

DETAILED DESCRIPTION OF THE INVENTION

Figure 1:
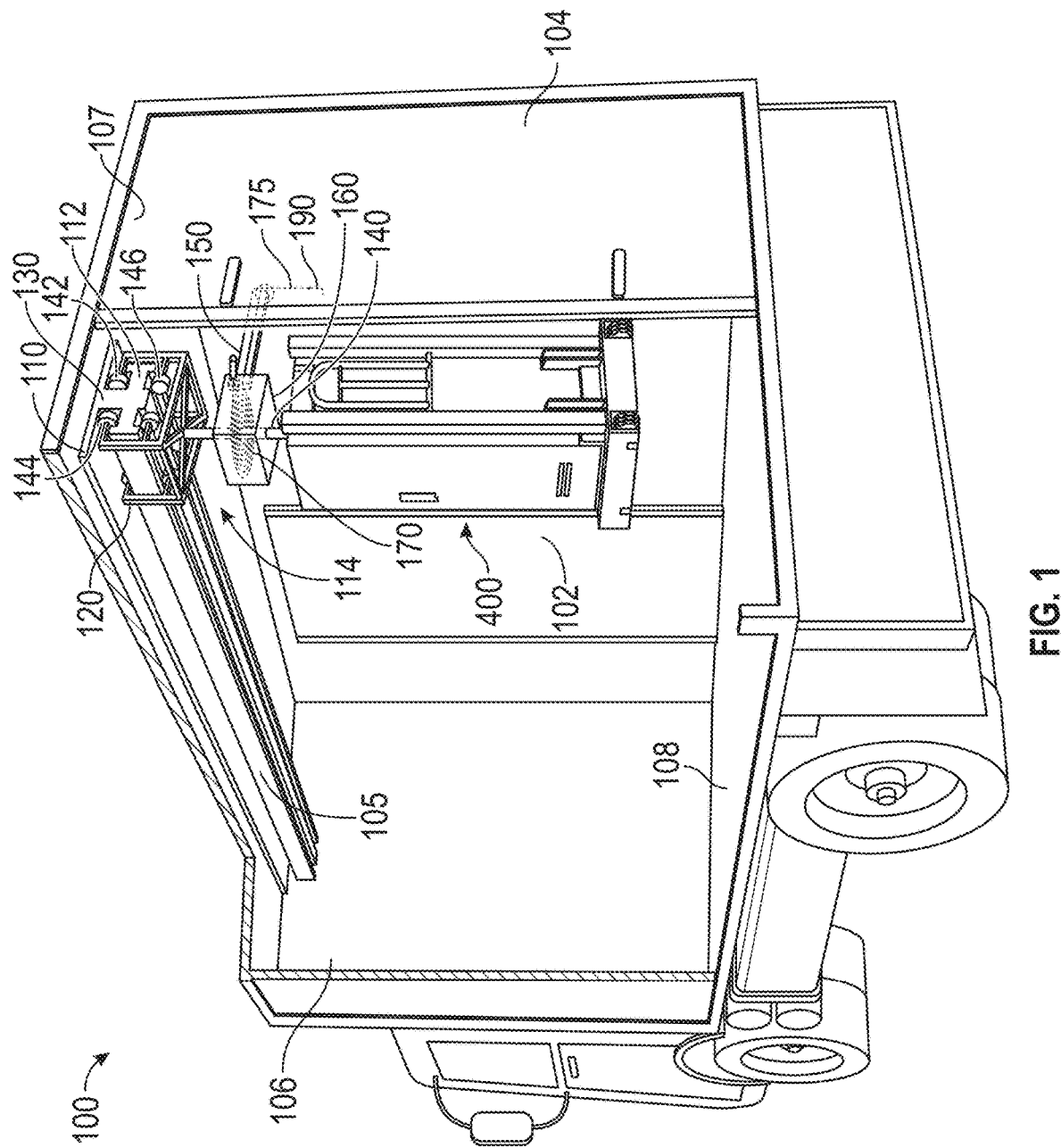
FIG. 1 is a cutaway view into an interior of a truck trailer comprising a horizontally Railed Crane Bot on a roof of the trailer.

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In an embodiment of the invention there is a Porch Bot for transporting products comprising a storage shell having a shelved interior for storing the products on shelves, brace rails on an external side of the storage shell, a handle frame displaceable along the brace rails to fixed positions in register with the shelves to support the products that have slid out of the shelved interior. Groceries may be packed into cases and loaded into the Porch Bot using a handle to pull the Porch Bot down an aisle of groceries. Then, the Porch Bot is loaded into a truck trailer and transported to a porch, patio, or building landing for storage.

The handle frame may comprise arms which clasp opposite sides of the storage shell. One of the sides grasped by the arms may include a side comprising a door into the shelved interior. Thus, the handle frame also helps keep the groceries secure inside the Porch Bot.

In an embodiment of the invention there is a Porch Bot Elevator for lifting and rotating a Porch Bot to position the Porch Bot inside and outside a truck trailer. The Porch Bot Elevator may be situated near an exit of the truck trailer to facilitate moving Porch Bots into and out of the truck trailer. The Porch Bot Elevator may comprise a column support, a trunnion rotatably connected in parallel to the column support, and a platform base connected orthogonal to the trunnion. The platform base may be rotated around the column support by turning the trunnion. The trunnion may be situated in the truck trailer near the exit so that Porch Bots may be rotated into and out of the truck trailer by rotating the platform base.

The column support may comprise at least one threaded eyelet through which the trunnion passes to rotatably connect to the column support. The eyelets may extend laterally from the column portion. Two or more eyelets may be aligned parallel to the column portion of the column support. Preferably, the centers of the eyelets determine a straight line parallel to the column support.

The trunnion may be secured in the parallel position relative to the column support by passing through the eyelets. The platform base may be translated around the column support by turning the trunnion in the eyelets. By virtue of the trunnion threaded engagement with the first and second eyelets, the trunnion also translates parallel to column support when rotated. The Porch Bot Elevator is ideally located at a corner of a truck trailer proximate a rear door. It may be located by an edge of a side door opening of the truck trailer. So the Porch Bot Elevator is useful for lifting Porch Bots into and out of the truck trailer.

The Porch Bot Elevator may be configured with the trunnion passing through an eye of each of the first and second eyelets. The two centers of the eyes determine a straight line parallel to the column support. So the trunnion is rotatably held parallel to the column support.

The Porch Bot Elevator may comprise in the column support a longitudinal slot to access a longitudinal traversing mechanism which the column support comprises in its interior. The mechanism may be connected to the eyelet to translate the eyelet along the length of the column support. The trunnion may be screwed into the eyelet. The platform base is preferably connected to the trunnion. Thus, the platform base may be translated parallel to the column support by the longitudinal traversing mechanism. So the platform base may be moved parallel to the column support without rotating the platform base and without rotating the trunnion. The eyelets may be connected to the longitudinal traversing mechanism to translate the platform base parallel to the column support.

In an embodiment of the invention there is a Railed Crane Bot that may comprise a roof rail to be connected to a roof of a truck trailer longitudinally intermediate a front wall and an opposite rear door of the truck trailer. The Railed Crane Bot may also comprise a rail car constrained to run longitudinally along the roof rail. It may be that suspended from the rail car is a winch having a cord with a free end to lift and position the Porch Bot. There may be a hook to temporarily attach to the Porch Bot and lift and place the Porch Bot to positions within the trailer.

The Railed Crane Bot apparatus may comprise an extension arm which extends in one or more directions. The extension arm may extend in an orthogonal to longitudinal direction of the roof rail. The hook may hang from a cord which hangs over a distal end of the extension arm from the rail car.

In an embodiment of the invention there is a method of using a Product Transport and Storage system wherein relocating said Porch Bot to a delivery address for said products further comprises moving said Porch Bot into a Modern Milk Truck (MMT), lifting and positioning said Porch Bot for stowage within said MMT using a Railed Crane Bot, transporting said Porch Bot to said delivery address, unloading said Porch Bot using said Railed Crane Bot, transporting said Porch Bot to a delivery position.

In an embodiment of the invention there is a Railed Fork Bot for lifting and positioning a Porch Bot in a truck trailer. The Railed Fork Bot may comprise a base end distal from a distal end. The Railed Fork Bot may comprise tines of a fork to lift the Porch Bot. The tines extend, preferably orthogonally, from a carriage which slides along a rail arm. The carriage may slide from the base end to the distal end. The base end may be configured to support the Railed Fork Bot vertically from a floor of the trailer.

In an embodiment of the invention there is a method of using a Product Transport and Storage System wherein relocating said Porch Bot to a delivery address for said products further comprises moving said Porch Bot into a Modern Milk Truck (MMT), lifting and positioning said Porch Bot for stowage within said MMT using a Railed Fork Bot, transporting said Porch Bot to said delivery address, unloading said Porch Bot using said Railed Fork Bot, and transporting said Porch Bot to a delivery position. The Railed Fork Bot may comprise a base end distal from a distal end, tines of a fork to lift the Porch Bot wherein the fork extends from a carriage which slides along the rail arm from the base end to the distal end, and the base end is configured to support the Railed Fork Bot vertically from a floor of the trailer, and the distal end comprises a rail car interface to connect to a rail car on a roof of the truck trailer to stabilize the rail car as a column.

In an embodiment of the invention there is a method of eliminating product delivery packaging using a Product Transport and Storage system comprising receiving an electronic order for a plurality of products, selecting and collecting said plurality of products then storing said products within a Porch Bot, relocating said Porch Bot to a delivery address for said products.

Referring to the Figures, there is shown in FIG. 1 a truck having a covered trailer for transporting goods protected from wind, rain, and unwanted access. A side wall of the trailer has an access door 102 and a rear door 104. The trailer has front wall adjacent to the cab of truck. The truck trailer is used to transport Porch Bots, such as shown in FIG. 4.

Figure 4:
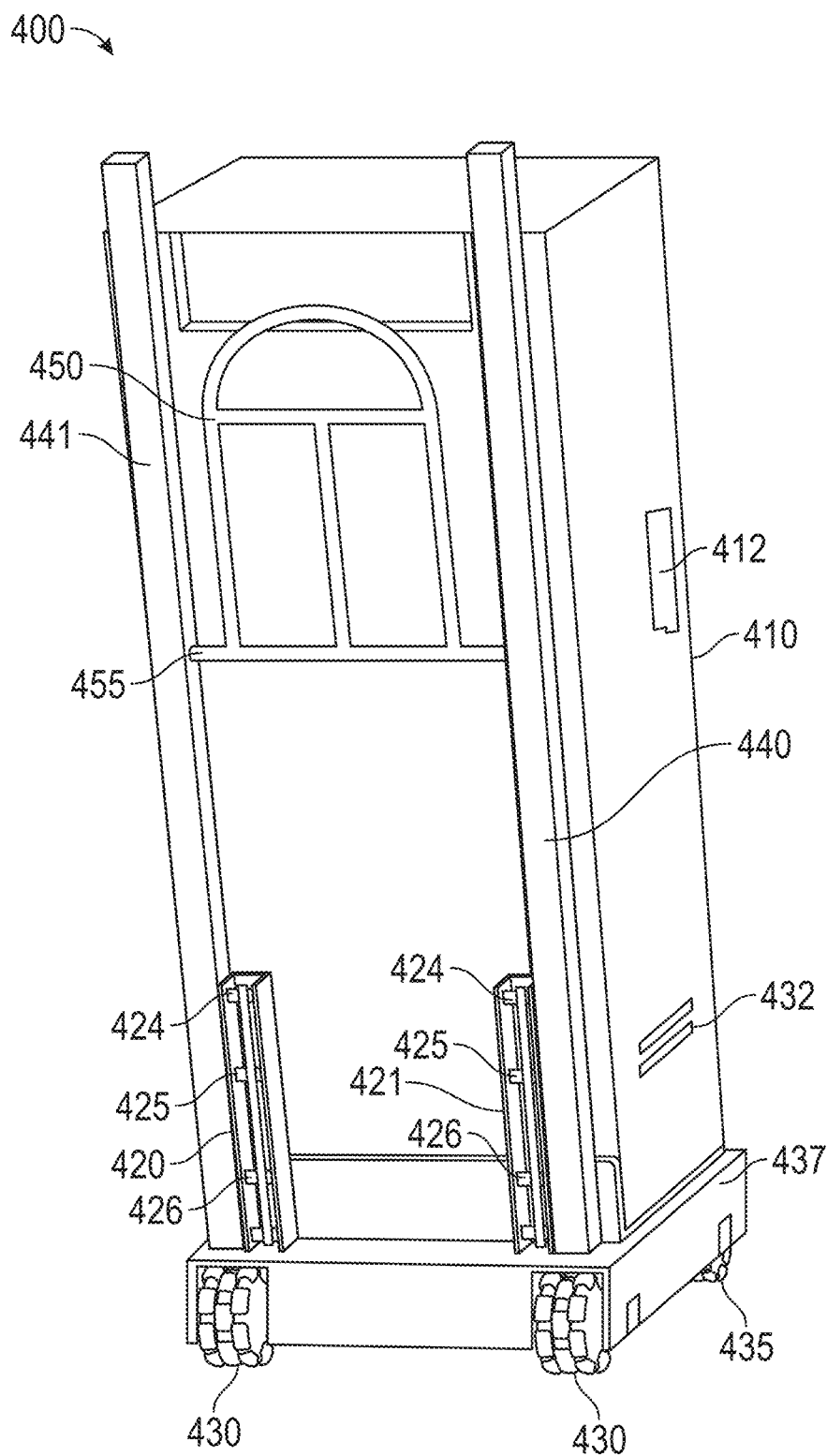
FIG. 4 is a perspective view of a Porch Bot comprising a cabinet to store and transport cases of groceries.

The Porch Bot 400 shown in FIG. 4 has a vertical length ranging between a meter or yard to five meters or yards. When the Porch Bot 400 is in a truck trailer shown in FIG. 1, the Porch Bot stands from the floor 108 to the roof 107 of the trailer. When the Porch Bot 400 is full of cases full of groceries, it may weigh up to a ton or have a mass near a thousand kilograms. So a single person may require the Bots to lift and place the Porch Bot.

Figure 6:
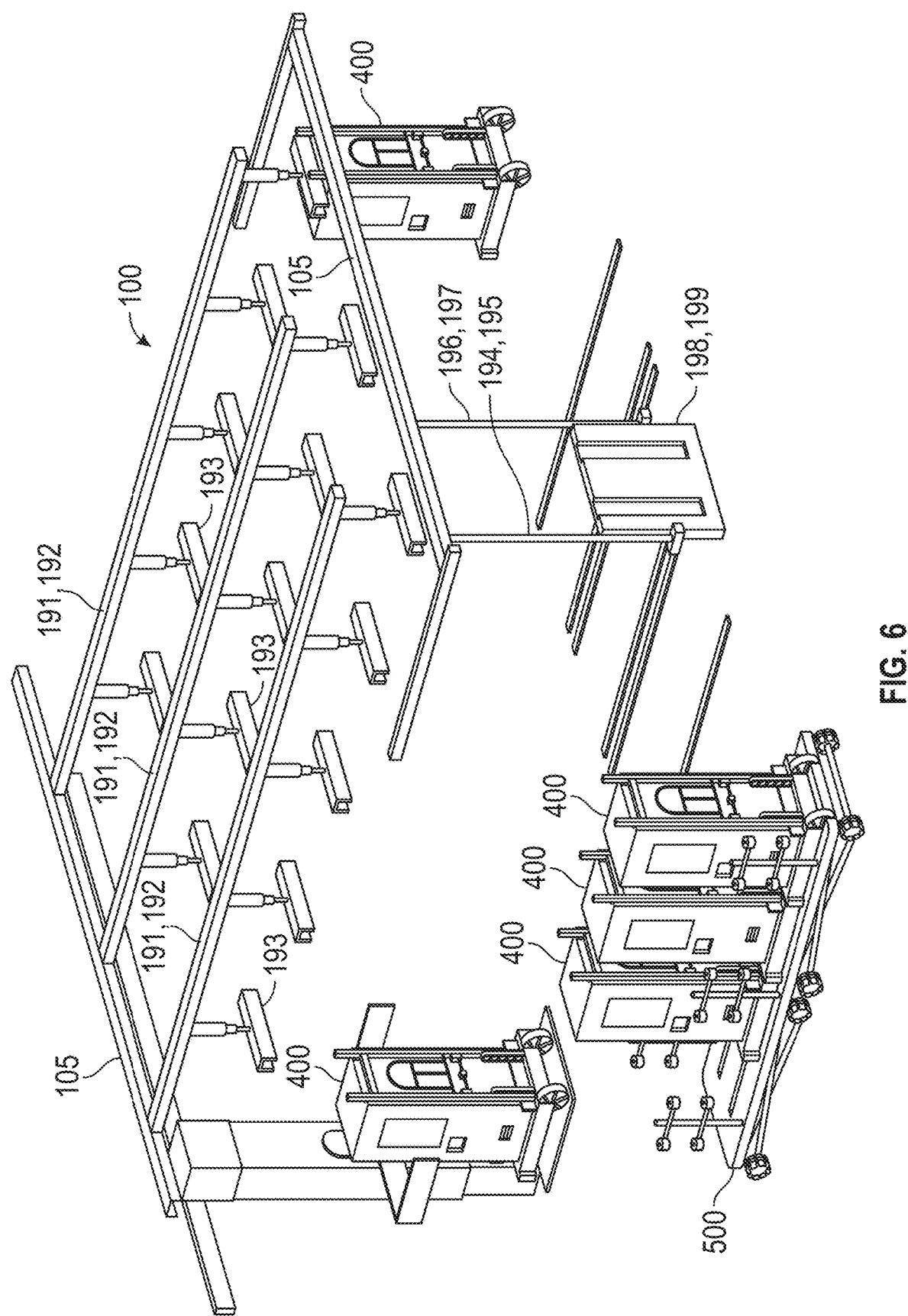
FIG. 6 is a view of a second embodiment of the horizontally Railed Crane Bot.
Figure 7:
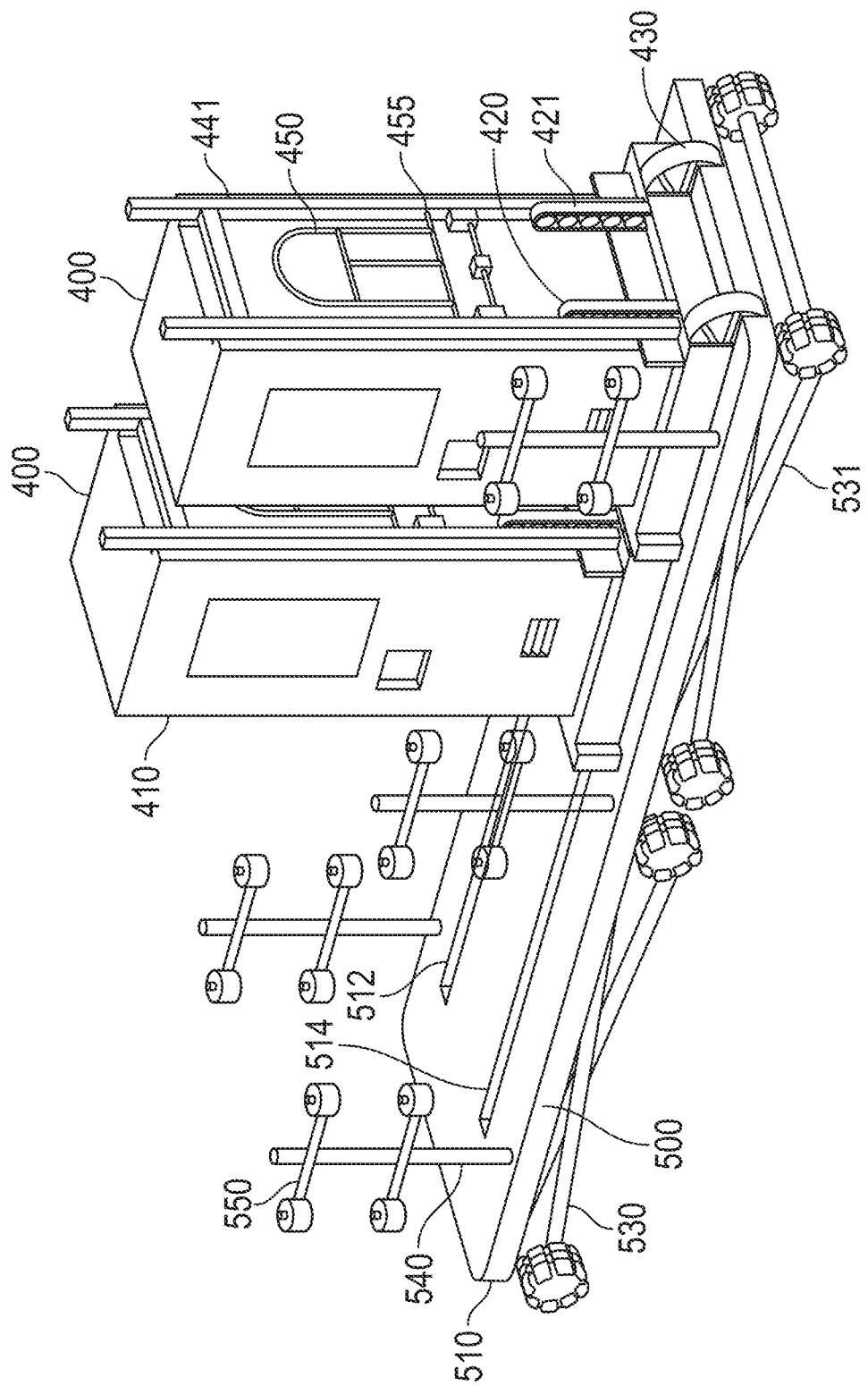
FIG. 7 is a perspective view of two Porch Bots placed on top of a Mother Bot.
Figure 8:
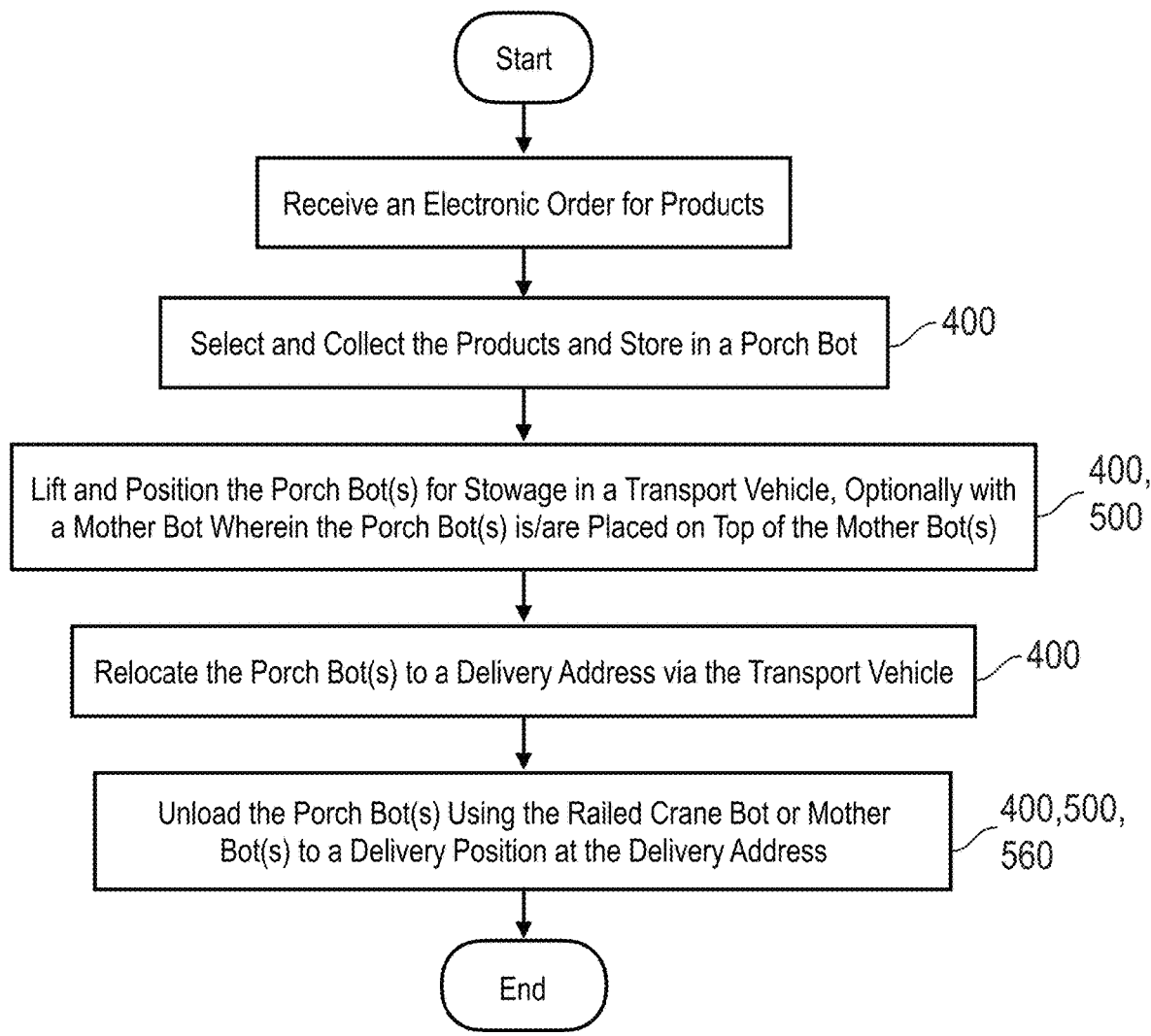
FIG. 8 is a flowchart depicting a method of using a Product Transport and Storage System.

Inside the trailer attached to the roof is a Railed Crane Bot 100. Examples of the Railed Crane Bot are shown in FIG. 1 and FIG. 6. A purpose of the Railed Crane Bot is to lift and carry Porch Bots 400 inside the trailer. An example of a Porch Bot is shown in FIG. 4. A person can use the Railed Crane Bot to lift and carry Porch Bots so as to place them in an orderly arrangement inside the trailer.

As shown in FIG. 1 the Railed Crane Bot 100 comprises a roof rail 105 extending along the roof of the trailer from the front wall to the rear door 104. The rail has an I beam cross section. A top flange 110 of the I beam 105 is fixed to the roof. A lower flange 112 is connected to the top flange 110 by a web 130.

A rail car 114 runs on upper wheels 142 on top of the lower flange 112. The rail car 114 is able to run on the lower flange inside the trailer from the front wall 106 to the rear door 104. So the Porch Bots may be placed quickly in places anywhere between the front wall 106 to the rear door 104 of the trailer.

The rail car 114 also has lower wheels 146 which run along the bottom of the lower flange 112. The upper wheels 142 comprise a pair with the web 130 of the flange intermediate them so that the rail car is constrained to run longitudinally along the rail. The web prevent the rail car from moving sideways and so the rail car 114 is safely supported on the rail 105 so that it will not inadvertently fall off the rail 105.

As shown in FIG. 1, the rail car 105 comprises a cage 120 to which the wheels 142 and 146 are connected. Also connected to the cage 120 is a winch 170. The winch 170 is suspended from the cage so as to be underneath the cage 120 and rail 105. So as the rail car 105 moves along the rail to and from the front wall 106 to the rear door 104, the winch 170 moves with the cage 120 along the rail.

As shown in FIG. 1, the winch 170 comprises a cord 175 on a spool. At the free end of the cord 175 is a hook 190 or hitch. By unspooling the cord 175, the hook 190 or hitch can be lowered from the rail car 114 proximate the roof the trailer down to the floor 108 of the trailer. By winding the cord onto the spool the hook can be raised from the floor 108 up to the rail car 114.

The hook 190 or hitch is connectable to a case of groceries so that an individual case can be lifted from the floor or lowered to the floor. A person can this way use the Railed Crane Bot to carry a case from a shelf in a porch bot to the floor and to transport the case anywhere in the trailer from the front wall 106 to the rear door 104.

The winch 170 comprises an extension arm 150 which extends horizontally under the rail 105. The length of the extension arm is about a meter or yard or about a depth into a Porch Bot 400 or about a quarter to a half the width from the side to side of the trailer. The cord 175 travel along the length of the extension arm 150 so that the hook 190 hangs from the distal end of the extension arm 150 from the cage 120. The winch 170 is suspended from the cage 120 by an axle 140. So the extension arm 150 can rotate around the axle to easily hang cases out the side door or the back door. Placing cases of groceries from inside to outside the trailer and vice versa is therefore possible as is lifting and placing Porch Bots 400 from inside the trailer to outside the trailer and vice versa. So a person can use the Railed Crane Bot to lift individual cases of groceries into and out of the truck trailer and into and out of the individual Porch Bots whether the Porch Bots are inside or outside the truck trailer.

Figure 2:
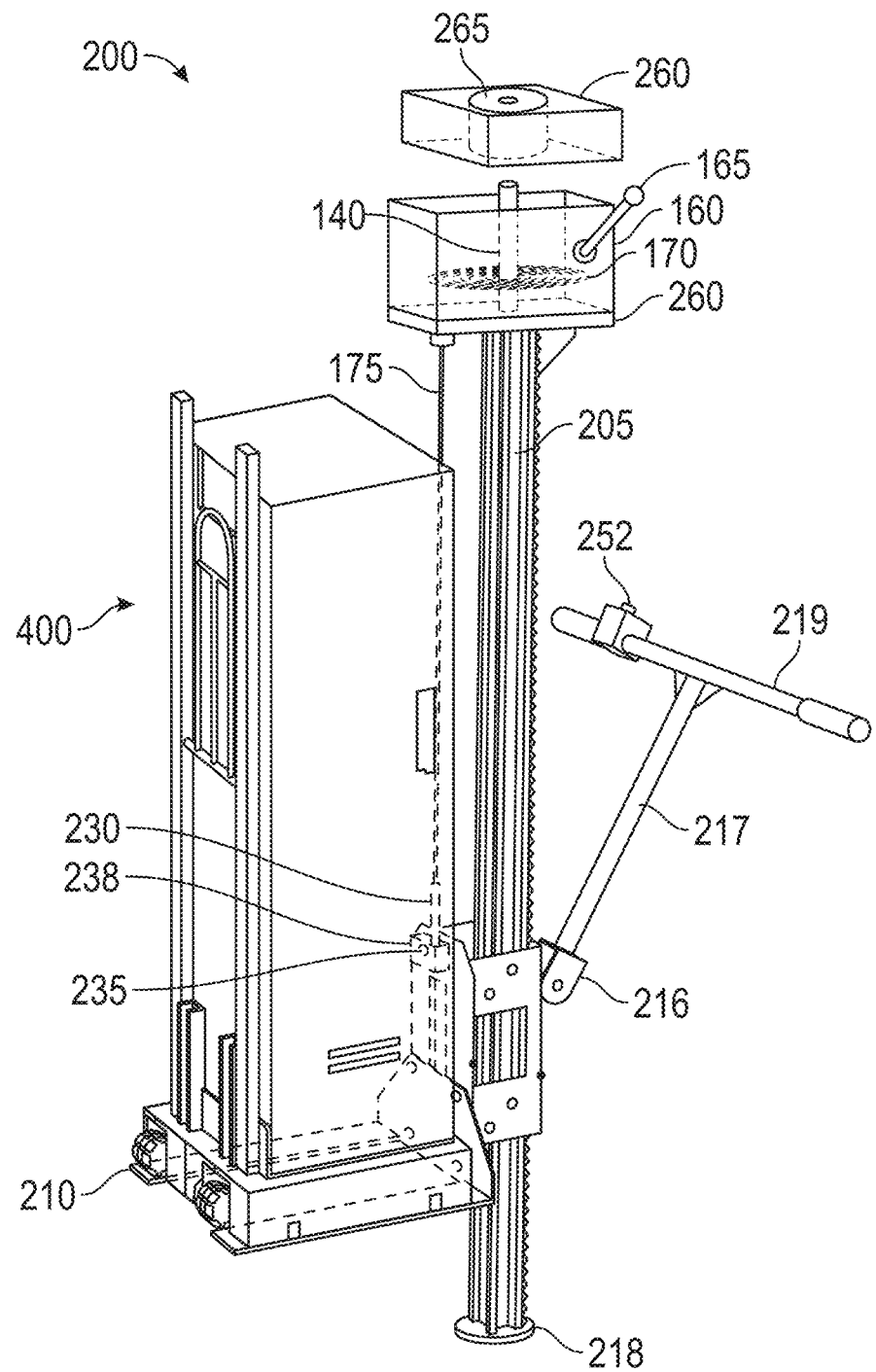
FIG. 2 is a perspective view of a vertically Railed Fork Lift Bot supported and placed in the trailer by the Railed Crane Bot shown in FIG. 1.

The load capacity of the roof of a typical truck trailer is to withstand a person walking on it or a few meters or yards of snow. Hence the load capacity of the Railed Crane Bot attached to the roof of the trailer may be insufficient to pick up a Porch Bot full of cases full of groceries. To lift and place a full Porch Bot in the truck trailer, FIG. 2 shows a Railed Fork Bot 200.

Another embodiment of the Railed Crane Bot 100 is shown in FIG. 6. Minor rails 191, 192 are arrayed parallel and on either side of the roof rail 105. The minor rails 191, 192 are attached to the truck trailer roof. The minor rails 191, 192 are less massive and less heavy than the roof rail 105.

Stabilizing brackets 193 extend vertically down from the horizontally orientated minor rails 191, 192. The stabilizing brackets 193 are configured to connect to Porch Bots resting on Mother Bots inside the truck trailer. The stabilizing brackets 193 help to prevent the Porch Bot from rolling or toppling off of the Mother Bot or the transport vehicle.

As shown in FIG. 6 at both longitudinal ends of the roof rail 105 there is a pair of vertical bars 194, 195, 196, 197 suspended from the roof rail 105. The vertical bars hang down into the truck interior. The bars have a distal end in the truck interior. At the distal end of each pair of vertical bar from the roof rail 105 is a plate 198, 199 between the two bars of the pair. Each plate 198, 199 is rotatably connected between the pair of vertical bars. Each plate 198, 199 may be rotated to a horizontal position to carry a Porch Bot. Each plate may be rotated to a vertical position to be stored between Porch Bots in the truck trailer.

The Railed Fork Bot 200 shown in FIG. 2 comprises a rail 205 which stands vertically. The rail 205 stands on the floor 108 of the truck trailer. The floor 108 is strong and able to support the weight of a full Porch Bot 400. The rail 205 length is sufficient to reach up to the underside of the winch 170 of the Railed Crane Bot 100.

The rail 205 has a base end comprising a wheel 218 which in use in the bottom end of the rail 205 supported on the floor. The rail 205 has a distal end from the base end which in use is the top end of the rail 205. The distal end is an interface 260 with a ring 265 to receive the axel 140 of the winch. When the Railed Fork Bot 200 is in use, it interfaces with the winch 170 so that the axel 140 and the rail 205 of the Railed Fork Bot 200 are parallel.

The cord 175 of winch 170 passes through an aperture in the interface 160. The hook 190 shown in FIG. 1 at the end of cord 175 is replaced by or has a form of a hitch 230 as shown in FIG. 2. The hitch 230 is connected to connector 235 on a carriage 238 which slides along the rail 205 of the Railed Fork Bot.

Tines of fork 210 half a yard or meter to a yard or meter long are connected to the carriage 238. The tines extend orthogonally from the rail 205 of the Railed Fork Bot. So in use the tines of fork 210 extend horizontally. To lift and place a Porch Bot 400, the tines of fork 210 shoved under the base 437 of the Porch Bot and then the tines of Fork 210 are lifted to lift the Porch Bot. The tines of fork 210 can also be shoved under an individual case on a shelf in the Porch Bot 400 to lift that case and, if desired, a stack of cases.

Since the tines of fork 210 are connected to the carriage 238, the tines of fork 210 are lifted by using the winch 170 to wind up the cord 175. So a person does not have to bear the weight of the cases full of groceries or Porch Bot 400 full of groceries since the winch 170 does the lifting. Although the winch does the work of lifting and is connected to the roof of the trailer, the roof does not have to support the weight of the Porch Bot 400 or cases full of groceries. This is because the weight is transferred to the floor 108 by the rail 205 of the Railed Fork Bot 200.

There is also a hand crank 217 comprising a handle 219 distal from a ratchet 216 connected to the carriage 238 to ratchet up the tines of fork 210. The ratchet engages with teeth arrayed along the longitudinal length of the rail 205 of the Railed Fork Bot 200. On the handle, there is button 252 linked to the ratchet 216 to engage/disengage the teeth.

The wheel 218 is connected by a swivel to the base end of the rail 205 of the Railed Fork Bot. The distal end of the rail is connected by the interface 260 to the carriage 120 of the Railed Crane Bot which may be moved from the front wall 106 to the rear door 104 of the trailer. This is so that the whole Railed Fork Bot supporting a Porch Bot 200 or case on the tines of Fork 210 can be moved to and from the rear door to positions within the trailer.

Figure 3:
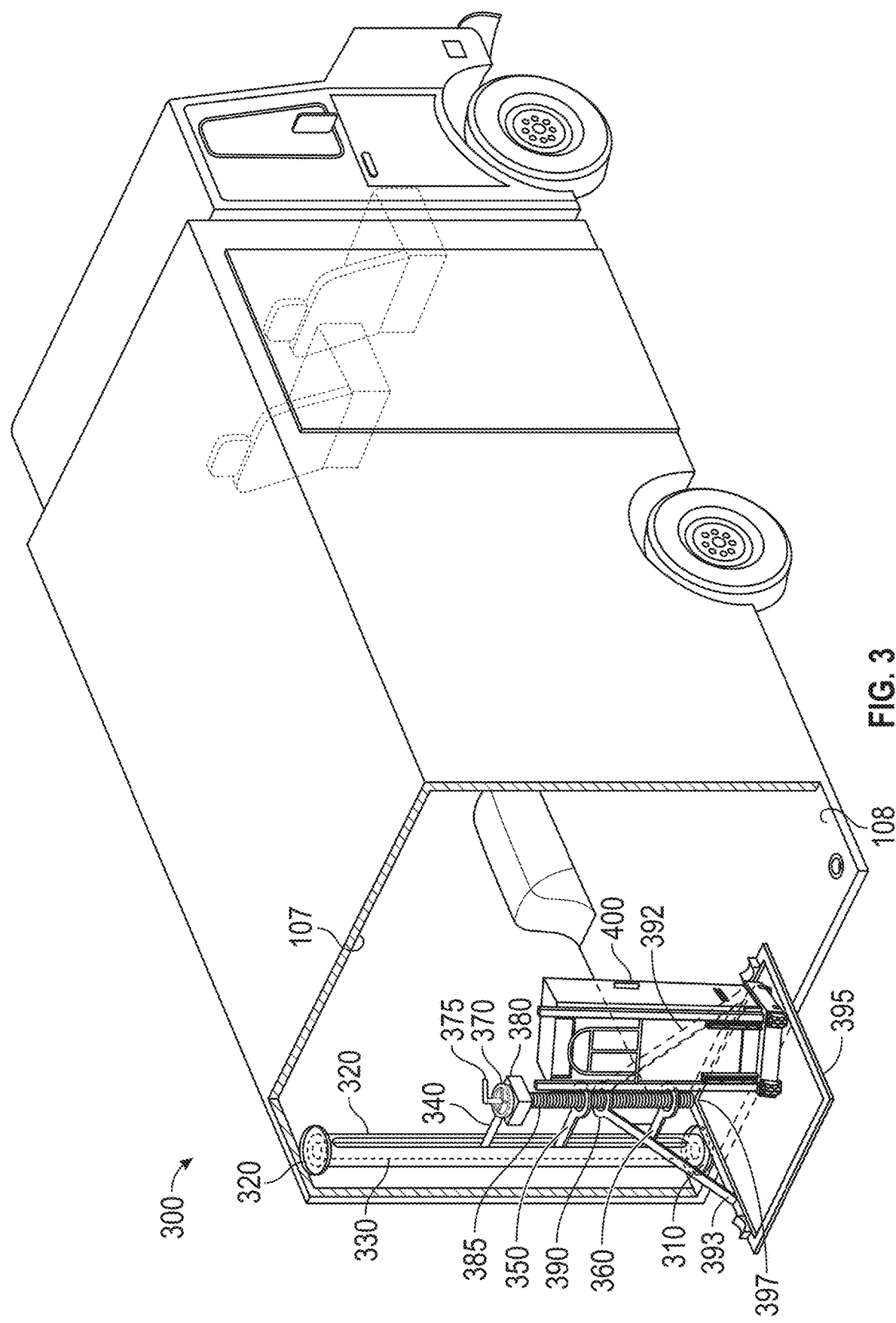
FIG. 3 is a perspective view into a rear opening of a truck trailer comprising a Porch Bot Elevator for lifting and rotating a porch bot proximate the rear opening.

As shown in FIG. 3, there is inside the truck trailer a Porch Bot Elevator 300. The Porch Bot Elevator 300 is disposed proximate the rear door 104 of the truck trailer. The Porch Bot Elevator is used to transfer Porch Bots 400 into and out of the truck trailer through the rear door 104 when open.

The Porch Bot Elevator 300 comprises a column support 330 arranged vertically intermediate the truck floor 108 and the ceiling of the truck roof 107. The column support 330 has a base end 310 which connects to the truck floor 108. A distal end 320 from the base end connected to the truck ceiling 107.

In some embodiments the base 310 and the distal end 320 comprise a pivot connection or bearing so that the column support 330 and components connected to it can rotate around the longitudinal axis of the column support 330. Components which extend radially away from the column can be rotated out the truck trailer through the rear door 104 when open.

The Porch Bot Elevator 300 comprises a trunnion 385 in a form of an externally threaded cylinder which has a length between one quarter and quarters the length of the column support 330. The trunnion 385 is supported parallel the column support 330 by three eyelets 340, 350, 360 which extend in a row from the column support 330. The eyelet 340 which is closest the distal end 320 of the column support 330 has an internal thread which meshes with the external thread of the trunnion 385. So turning the trunnion 385 drives it to move relative to the eyelet 340. The eyelets 350, 360 which are closer to the base 310 of the column support 330 are unthreaded and have an internal diameter which is provide a slip fit around the external thread of the trunnion 385. So these eyelets 350, 360 guide the trunnion stay parallel to the column support as the trunnion is driven by turning.

The trunnion 385 comprises a handle crank 375 on distal end which protrudes out of the eyelet 340 closest to the distal end of the column support.

The Porch Bot Elevator 300 comprises a platform base 395 arranged orthogonal to the trunnion 385 and to the column support 330. So in use the platform base 395 is parallel to the floor 108 of the truck trailer. The platform base 395 positioned underneath Porch Bots 400 to raise the Porch Bots above the floor 108 of the truck trailer so that the Porch Bots can be transferred into and out of the truck trailer through the rear door 104 when the rear door is open.

The platform base 395 comprises a frame around the perimeter of the platform base.

The frame is a lightweight device to reinforce the platform base 395 to support the weight of a Porch Bot 400 full of groceries.

At least one strut 392 and in some embodiments also a second strut 393 extend at an angle away from the plane of the platform base 395. The struts 392, 393 extend to a ring 390 arranged parallel to the main frame of the platform base 395. The trunnion 385 passes through the hollow of the ring. The trunnion 385 has a base end 397 distal from the crank 375. The base end 397 is connected to the frame of the platform base 395. So when the crank 375 is used to turn the trunnion, it also turns the platform base 395.

The ring 390 is centered with respect to the location that the base end 397 is connected to the frame of the platform base 395. The ring 390 is intermediate the two eyelets 350, 360 which are closest to the base 310 of the column support 330. This ensures that the platform base 395 is held orthogonal to the trunnion 385 and parallel to the floor 108 of the truck trailer.

The three eyelets 340, 350, 360 are connected through a longitudinal slot 320 in the column support 330 to a longitudinal traversing mechanism which the column support comprises in its interior. The longitudinal traversing mechanism can move the three eyelets closer to base end 310 of the column support 330. The longitudinal traversing mechanism can also move the three eyelets closer to distal end 320 of the column support 330. So the platform base 395 is raised and lowered relative to the truck trailer floor 108 by the movement of the longitudinal traversing mechanism.

The column support 330 is connected at its base end 310 to the floor 108 truck trailer and the distal end 310 is connected to the roof 107 of the truck trailer. The trunnion 385 is secured parallel the column support 330 by being held within the eyelets 340, 350, 360. The platform base 395 is secured orthogonal to the trunnion 385 by the ring 390 at the distal end of the struts 392, 393 and the connection at the 397 base end of the trunnion to the platform base 395. There the entire Porch Bot Elevator 300 is secured stable within the truck trailer. So Porch Bots 400 and case of groceries are transferred safely on the platform base 395 through the rear door 104 of the truck trailer.

A Porch Bot 400 is shown in FIG. 4. The Porch Bot comprises block shaped cabinet 410. The cabinet is in the form of a shell. The interior of the shell has shelves for cases of groceries. The box shaped cabinet is a third of meter or a foot deep to a meter or three feet deep. It is about a half meter or a foot and a half wide to about two meters or six feet wide. It is about two meters or six feet high to seven meters or 21 feet high. The Porch Bot is sized to be placed in a truck trailer and carried over road to transport store groceries within the Porch Bot.

The Porch Bot 400 cabinet 410 is supported by a base 437. The base 437 is capable of supporting a Porch Bot containing a ton or thousand kilograms of groceries. The base comprises wheels 430 at rear corners and wheels 435 at front corners. The base 437 comprises a plate which may be reinforced by perpendicular sides or ribs.

The Porch Bot comprises a pair of brace rails 440, 441. The brace rails 440, 441 are parallel each other and extend perpendicular to the base from two adjacent corners. A side of the cabinet 410 is connected to the brace rails 440, 441. Thus the Porch Bot may function as dolly for groceries within. A person may grasp brace rails, tilt the platform onto only the wheels 430 directly under the brace rails 440, 441 and move the Porch Bot 400 on the wheel 430.

The Porch Bot 400 comprises a handle 450 connected to the rails by a bar 455 just about halfway up the height of the cabinet 410. The handle 450 helps moving the Porch Bot 400 on wheels 430, 435 at all the corners of the base 437. Using the handle 450 Porch Bot 400 does not have to tipped onto just the wheels directly underneath the braces 440, 441. The handle 450 provides a safer way of moving.

The bar 455 spans a space between the two brace rails 440, 441. The bar 455 has a first lock to hold the handle 450 in a parallel position between the brace rails. The bar 455 has a second lock to hold the handle 450 in a second position extending orthogonally away from form the brace rails 440, 442 and the side of the cabinet 410 parallel connected to the brace rails 440, 441. In the second position the handle may be used as horizontal support rest for a case of groceries or a tray.

The handlebar 455 may be displaceable along the brace rails 440, 441 to fixed positions in register with shelves the interior of the cabinet 410 to support the cases on slid out the cabinet from the shelves.

The cabinet 410 has a latch door lock 412 on an adjacent side perpendicular to the side connected to the brace rails 440, 441. There are vents 432 through the adjacent side to permit escape of sublimating dry ice CO2 and to provide ventilation to prevent accidental suffocation.

The cabinet 410 has an openable door on a side opposite the side connected to the brace rails 440, 410. Cases of groceries are loaded into and out of the Porch Bot 400 through the openable door.

The Porch Bot has a pair of stair climbing treads 424, 425, 426 in channels 420, 421 which extend up from the platform base 437. The channels 420, 421 are attached to the brace rails 440, 441 for reinforcement.

Figure 5:
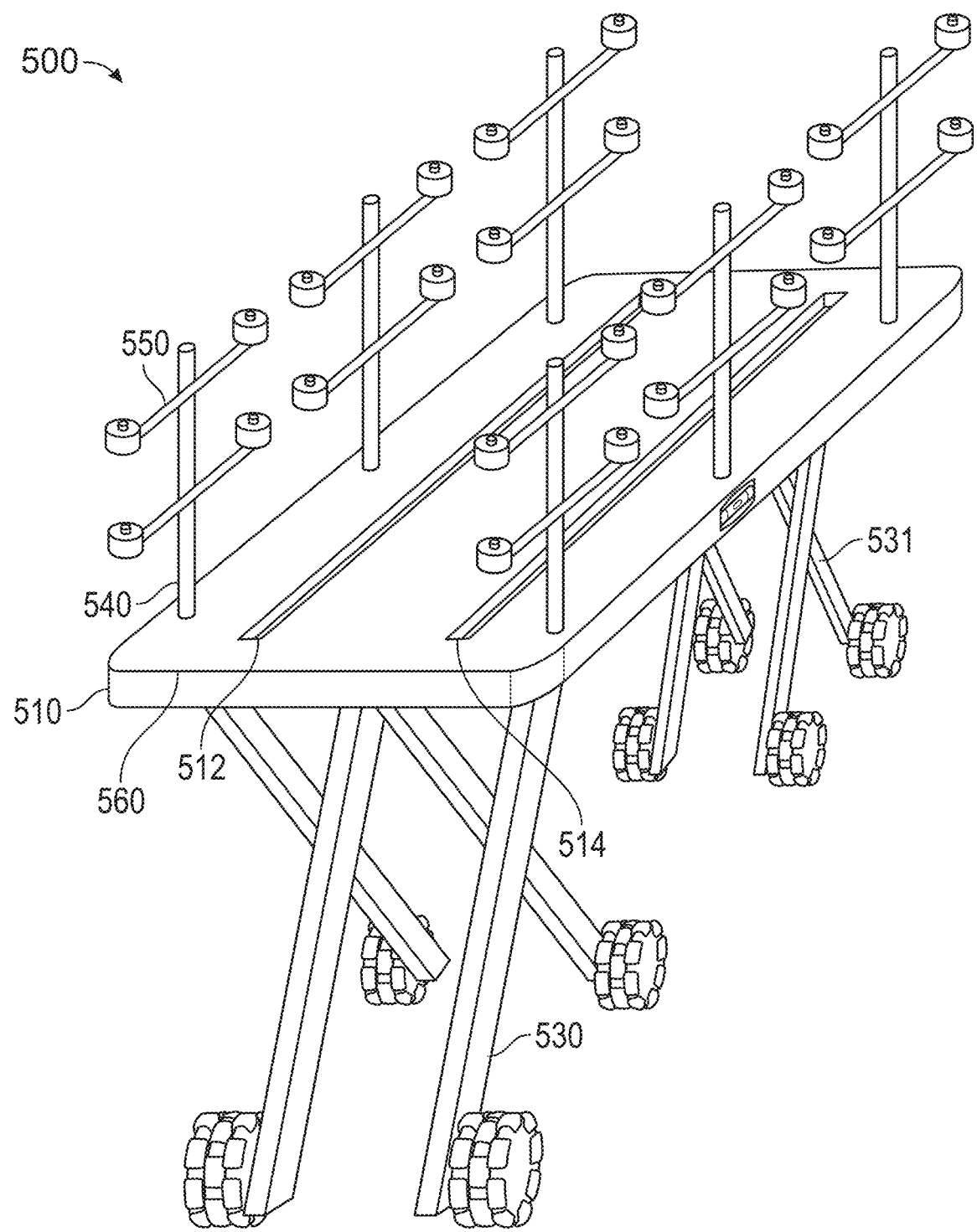
FIG. 5 is a perspective view of a Mother Bot comprising a gurney-like platform to transport Porch Bots as shown in FIG. 4 from a truck trailer shown in FIG. 1 or 3 to a porch, patio, or landing of a building.

A Mother Bot 500 is shown in FIG. 5. The Mother Bot comprises a bed 510 support on two pairs of scissor lifts 530, 531. There are parallel channels 512, 514 which extend lengthwise in the base to receive wheels 430, 435 or capture prongs on the bottom of a base 437 of a Porch Bot. Extension arms 540 extend from the bed opposite and away from the scissor lifts. Fence arms 550 extend laterally form the extension arms 540 and parallel the longitudinal sides of the bed 510. Extension arms 540 and extensions act as guide rails to prevent the Porch Bot 400 from falling off and from falling over the longitudinal sides of the Mother Bot.

The Mother Bot 500 is used to transport Porch Bots to and from the truck trailer floor 108.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A Product Transport and Storage System comprising:
   at least one Porch Bot comprising:
      a storage shell having a shelved interior for storing products;
      brace rails on an external side of the storage shell; and
      a handle frame displaceable along the brace rails to fixed positions in register with the shelves to support the products slid out of the shelved interior;
   a Mother Bot comprising:
      a pad having a side to support at least one Porch Bot; and
      an adjustable height lift connected to an opposite side of the pad from the side to support at least one Porch Bot, wherein the adjustable height lift is configured to raise, lower, and translate the pad from a landing to a transport vehicle bed.

2. The Product Transport and Storage System according to claim 1, wherein at least one Porch Bot comprises brace rails on an external side of the storage shell to support a handle frame displaceable along the brace rails.

3. The Product Transport and Storage System according to claim 1, wherein at least one Porch Bot comprises a handle frame displaceable along the brace rails to fixed positions in register with the shelves to securely support the products slid out of the shelved interior.

4. The Product Transport and Storage System according to claim 1, wherein the adjustable height lift comprises at least one scissors lift having legs connected to an opposite side of the pad from the side to support at least one Porch Bot, the legs having rolling wheels at a free end distal from the pad to roll on the landing and the transport vehicle bed surface to transport the Mother Bot.

5. A method of using a Product Transport and Storage System according to claim 1 comprising:
   receiving an electronic order for a plurality of products;
   selecting and collecting said plurality of products, then storing said plurality of products within at least one Porch Bot; and
   relocating said at least one Porch Bot to a delivery address for said plurality of products.

6. The method according to claim 5, further comprising:
   moving said at least one Porch Bot into a Modern Milk Truck (MMT);
   lifting and positioning said at least one Porch Bot for stowage within said MMT using a Railed Crane Bot;
   transporting said at least one Porch Bot to said delivery address;
   unloading said at least one Porch Bot using the Railed Crane Bot; and
   transporting said at least one Porch Bot to a delivery position.

7. The method according to claim 6, wherein relocating at least one Porch Bot to a delivery address further comprises:
   transporting a plurality of Porch Bots together upon the Mother Bot; and
   unloading said plurality of Porch Bots at the delivery position.

8. A Porch Bot Elevator for lifting and rotating a Porch Bot comprising:
- a column support;
- a trunnion rotatably connected to the column support in parallel; and
- a platform base connected orthogonal to the trunnion, wherein the platform base is configured to rotate around to the column support by turning the trunnion.

9. The Porch Bot Elevator according to claim 8, wherein the column support comprises at least one threaded eyelet through which the trunnion passes to translate the platform base parallel to the column support while providing support for lifting.

10. The Porch Bot Elevator according to claim 9, wherein the column support has a longitudinal slot to access a longitudinal traversing mechanism inside the column support, wherein the threaded eyelet is connected to the longitudinal traversing mechanism for translation of the platform base.

11. A Railed Fork Bot for lifting and positioning in a transport vehicle a Porch Bot comprising a storage shell having a shelved interior, the Railed Fork Bot comprising:
- a base end distal from a distal end;
- tines of a fork to lift the Porch Bot, wherein the fork extends from a carriage which slides along a rail arm from the base end to the distal end;
- the base end is configured to support the Railed Fork Bot vertically from a transport vehicle bed floor; and
- the distal end comprises a rail car interface to connect to a rail car on a roof of the transport vehicle to stabilize the rail car as a column.

12. The Railed Fork Bot according to claim 11, wherein the rail car interface is arranged to connect the distal end of the rail arm to a winch on the rail car to raise and lower the carriage along the rail arm.

13. The Railed Fork Bot according to claim 11, comprising teeth arrayed along a longitudinal length of the rail arm, and the carriage comprises a ratchet which operates on the teeth to raise and lower the carriage along the rail arm.

14. The Railed Fork Bot according to claim 12, comprising a wheel on the base end of the rail arm to roll the rail arm along a transport vehicle surface, bed or floor.

15. A Railed Crane Bot apparatus for lifting and positioning in a transport vehicle a Porch Bot comprising a storage shell having a shelved interior, the Railed Crane Bot apparatus comprising: a roof rail to be connected to a roof of the transport vehicle longitudinally intermediate a front wall and an opposite rear door of the transport vehicle; a rail car which runs longitudinally along the roof rail; wherein suspended from the rail car is a winch having a cord with a free end with a hook to lift and position the Porch Bot.

16. The Railed Crane Bot apparatus according to claim 15 comprising an extension arm which extends in a direction orthogonal to the longitudinal direction of the roof rail, wherein the hook hangs from cord which hangs over a distal end of the extension arm.

\* \* \* \* \*